United States Patent
Rybka et al.

(10) Patent No.: US 10,792,836 B2
(45) Date of Patent: Oct. 6, 2020

(54) CONCRETE CUTTER WITH DEPTH SETTING AND RETENTION SYSTEM

(71) Applicant: Nanjing Chervon Industry Co., Ltd., Nanjing (CN)

(72) Inventors: Matthew Rybka, Hoffman Estates, IL (US); Patrick Sean Gallagher, Arlington Heights, IL (US); Miroslav Vuckovic, Skokie, IL (US)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 15/266,131

(22) Filed: Sep. 15, 2016

(65) Prior Publication Data
US 2018/0071955 A1    Mar. 15, 2018

(51) Int. Cl.
*B28D 1/04*    (2006.01)
*B23D 45/16*   (2006.01)
*B23D 47/02*   (2006.01)
*B27B 9/02*    (2006.01)

(52) U.S. Cl.
CPC ............ *B28D 1/045* (2013.01); *B23D 45/16* (2013.01); *B23D 47/02* (2013.01); *B27B 9/02* (2013.01)

(58) Field of Classification Search
CPC .. B27B 9/00; B27B 9/02; B28D 1/045; B23D 45/16; B23D 47/02
USPC .................................................. 30/375–377
See application file for complete search history.

(56) References Cited

U.S. PATENT DOCUMENTS

| | | | | |
|---|---|---|---|---|
| 1,803,068 A | * | 4/1931 | McKeage | B27B 9/02 30/390 |
| 2,973,950 A | | 3/1961 | Tucker | |
| 2,984,477 A | * | 5/1961 | Janulis | F16F 1/30 267/53 |
| 3,357,745 A | * | 12/1967 | Cooper | E01C 23/0933 299/39.3 |
| 4,353,165 A | | 10/1982 | Albery | |

(Continued)

FOREIGN PATENT DOCUMENTS

DE    4124234 A1    1/1993
DE    102006034136 A1    4/2007

(Continued)

OTHER PUBLICATIONS

International Search Report corresponding to International Patent Application No. PCT/EP2017/073230 (5 pages).

*Primary Examiner* — Kenneth E Peterson
*Assistant Examiner* — Fernando A Ayala
(74) *Attorney, Agent, or Firm* — Greenberg Traurig, LLP

(57) ABSTRACT

A power saw includes a base plate, housing, and spring. The base plate is configured to move along a workpiece, and includes a pivot mount and a first retaining member defining an arcuate slot. The housing is configured to receive a cutting tool, includes a pivoting member and a second retaining member, and has a center-of-mass located between the pivot mount and first retaining member. The pivoting member is engaged with the pivot mount to pivotably mount the housing thereto. The second retaining member is received in the slot to guide a pivot of the housing. The spring is engaged between the base plate and housing, and is exerts a spring force acting against the weight of the housing such that a resultant force is sufficient to enable engagement of the cutting tool with the workpiece.

8 Claims, 3 Drawing Sheets

(56) References Cited

U.S. PATENT DOCUMENTS

| | | | |
|---|---|---|---|
| 5,239,756 A * | 8/1993 | Matzo | B27B 9/00 |
| | | | 30/371 |
| 5,570,677 A * | 11/1996 | Chiuminatta | B23D 59/001 |
| | | | 125/13.01 |
| 5,676,126 A * | 10/1997 | Rupprecht | B27B 9/02 |
| | | | 125/13.03 |
| 6,112,736 A | 9/2000 | Bearden | |
| 7,975,388 B2 | 7/2011 | Fuchs et al. | |
| 8,209,872 B1 | 7/2012 | Ende | |
| 9,156,182 B2 | 10/2015 | Moreno | |
| 2005/0000338 A1 * | 1/2005 | Wascow | B27B 9/02 |
| | | | 83/473 |
| 2005/0155231 A1 * | 7/2005 | Hartmann | B27B 9/02 |
| | | | 30/377 |
| 2008/0022827 A1 * | 1/2008 | Weir | B27G 19/02 |
| | | | 83/478 |
| 2010/0043768 A1 * | 2/2010 | Yokota | B23D 59/006 |
| | | | 125/13.01 |
| 2012/0318112 A1 * | 12/2012 | Muto | B26B 25/00 |
| | | | 83/478 |
| 2017/0225357 A1 * | 8/2017 | Fritz | B27G 19/02 |

FOREIGN PATENT DOCUMENTS

| | | |
|---|---|---|
| EP | 0459121 A2 | 12/1991 |
| EP | 0734822 A2 | 10/1996 |
| EP | 2665573 A1 | 11/2013 |
| EP | 2929969 A1 | 10/2015 |

* cited by examiner

CONCRETE CUTTER WITH DEPTH SETTING AND RETENTION SYSTEM

TECHNICAL FIELD

This disclosure relates to power tools, and more particularly to concrete cutters.

BACKGROUND

Power saws are a type of cutting tool which are useful for quickly and easily cutting material, such as construction lumber and other building products. A common type of power saw is a portable circular saw, which includes a base plate, and a circular saw blade that extends below the foot plate. Typically, a user cuts a workpiece with a circular saw by resting the base plate on the workpiece, aligning the saw blade with a desired cut path, and then manually guiding the circular saw in the direction of the cut path, often following a marked line on the workpiece.

The base plate is typically pivotally connected to a housing of the circular saw, and defines an opening through which the blade extends. The depth of cut made by the saw blade is controllable by adjusting the pivotal position of the base plate. For example, the circular saw may be configured to make a shallow cut in or through a workpiece by pivoting the base plate to a position in which only a small portion of the saw blade extends from the bottom of the base plate. The circular saw may be configured to make to a deep cut in or through a workpiece by pivoting the base plate to a position in which a greater portion of the saw extends from the bottom of the base plate.

In some applications, a power saw is used to cut along a workpiece formed from a hard or dense material such as concrete. Due to the increased force needed to cut such materials relative to softer workpieces such as wood, the saw blade may be pushed upwards away from the desired depth of cut while the power saw travels along the workpiece. In order to maintain a consistent depth of cut, a user customarily holds the power saw down at the set depth over the entire traversal of the workpiece using manual force. The force needed to hold the saw blade in place while cutting into dense materials like concrete can be significant, making cutting into hard and dense workpieces a mechanically intensive task with high risks of inaccurate cutting as well as damage or injury to the user or power saw.

Therefore, what is needed is a power saw that can be set to a desired depth and that can retain the desired depth while cutting into hard or dense material without the manual force of a user.

SUMMARY

The following is a brief summary of subject matter described in greater detail herein. This summary is not intended to be limiting as to the scope of this disclosure or to the claims.

A power tool, in particular a power saw, includes a base plate, a housing, and a spring. The base plate is configured to move along a surface of a workpiece, and includes a pivot mount and a first retaining member. The first retaining member defines an arcuate slot extending along a direction normal to a plane of the base plate. The housing is configured to receive a cutting tool and includes a pivoting member and a second retaining member. The pivoting member is engaged with the pivot mount so as to pivotably mount the housing on the base plate about a pivot axis parallel to the plane of the base plate. The second retaining member is received in the arcuate slot of the first retaining member, such that the arcuate slot guides a pivoting motion of the housing about the pivot axis. The housing is further configured such that a center of mass of the housing is located between the first retaining member and the pivot mount. As a result, a weight of the housing acts on the housing in a direction of the workpiece. A first end of the spring is engaged with the base plate and a second end of the spring is engaged with the housing. The spring is configured to exert a spring force that acts against the weight of the housing and has a magnitude such that a resultant force of the spring force and the weight of the housing is sufficient to enable engagement of the cutting tool with the workpiece.

In one embodiment, the power tool further includes a stop member. The stop member is received in the arcuate slot of the first retaining member so as to be selectively positioned at different locations along the arcuate slot, and is configured to delimit an extent of the pivoting motion of the housing toward the workpiece such that the position of the stop member along the arcuate slot defines a cut depth for the cutting tool.

In another embodiment, the stop member includes a fixing member that is operable to fix the stop member at a selected position along the arcuate slot.

In a further embodiment, the stop member includes a third retaining member. The third retaining member is configured to engage with the second retaining member as the housing comes into contact with the stop member, such that the housing is held in place against the stop member. The fixing member further configured such that releasing the stop member to move along the arcuate slot also releases the second retaining member from the third retaining member.

In one embodiment, the third retaining member is a leaf spring.

In another embodiment, the third retaining member is a clip.

In a further embodiment, the fixing member includes a sliding bolt received in the arcuate slot, and a lever configured to selectively tighten and loosen the sliding bolt so as to respectively fix and release the sliding bolt within the arcuate slot.

In an embodiment, the base plate includes a plurality of wheels that enable the base plate to roll along the surface of the workpiece.

In one embodiment, the spring is a coil spring.

The above presents a simplified summary of this disclosure in order to provide a basic understanding of some aspects of the technologies disclosed herein, and is not an extensive or complete overview of such topics. As such, the summary above does not delineate the scope of this disclosure, and is not intended to identify key or critical aspects of the disclosure. Further details are provided by the detailed description, the claims, and the drawings.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one of ordinary skill in the art to which this document pertains.

Figure 1:
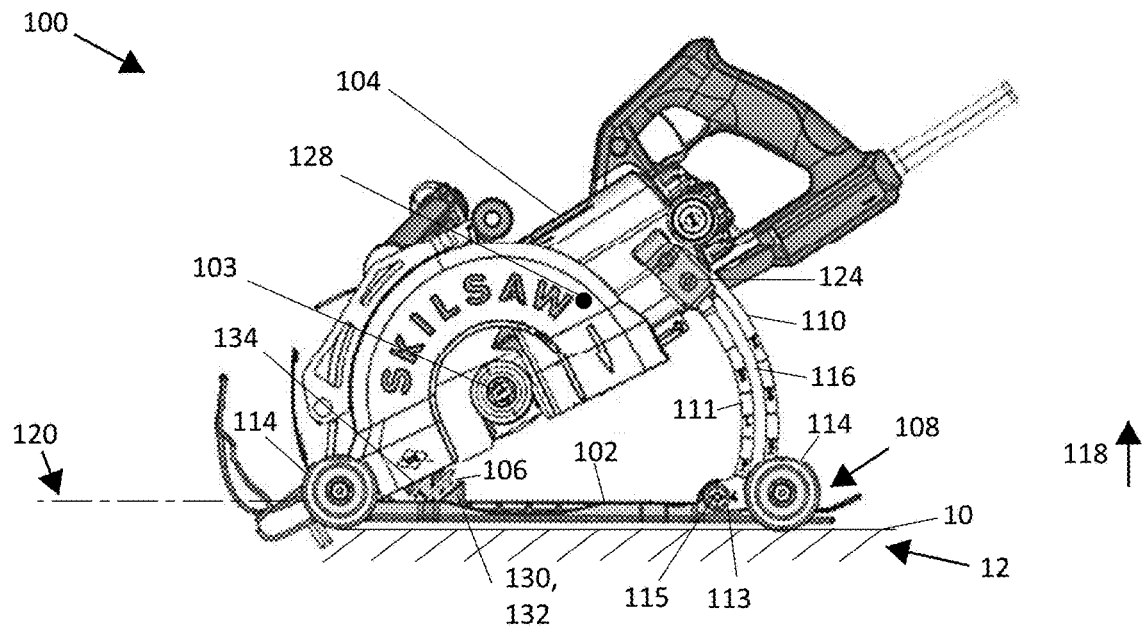
FIG. 1 illustrates a side view of an exemplary embodiment of a power saw according to this disclosure.
Figure 2:
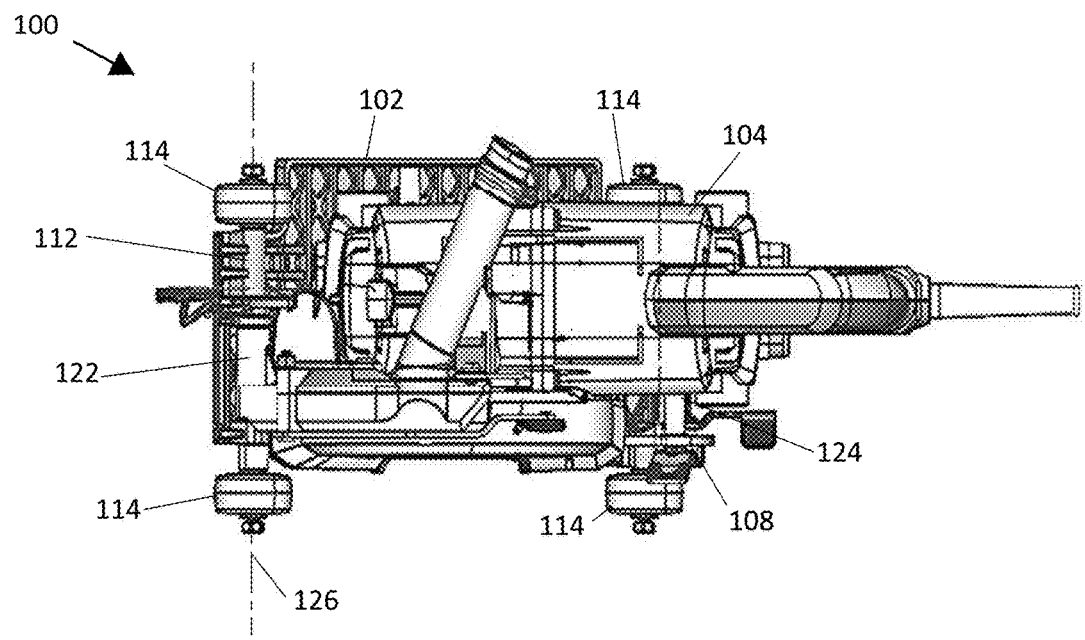
FIG. 2 illustrates a top view of the power saw of FIG. 1.
Figure 3:
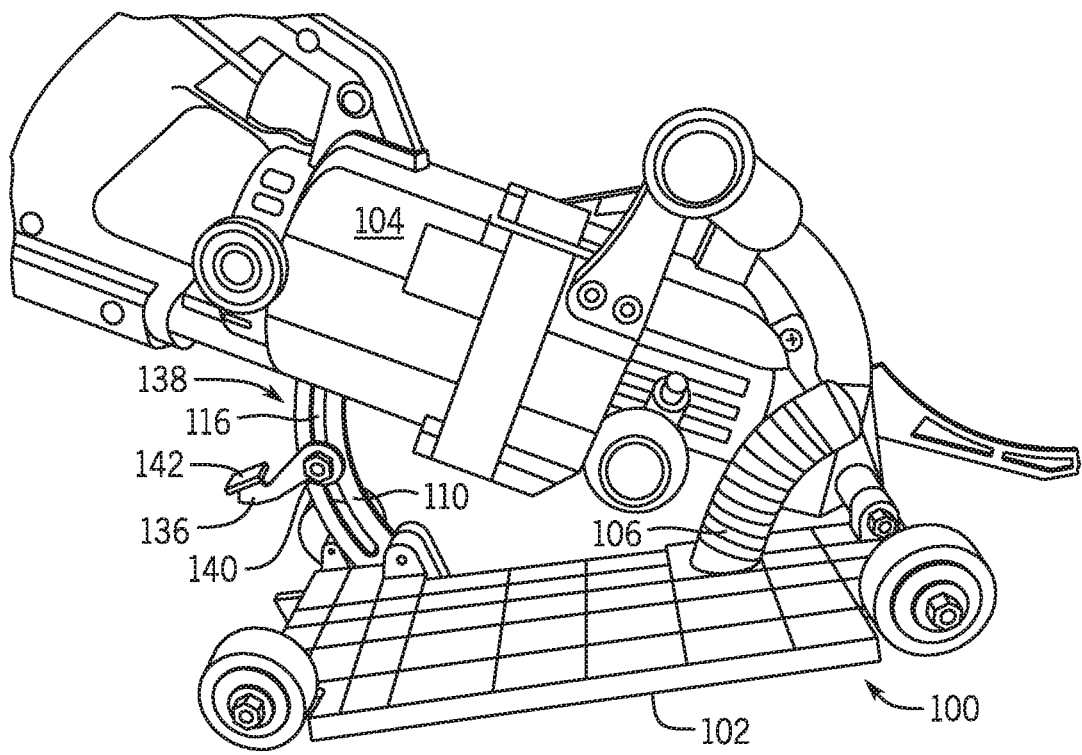
FIG. 3 is a perspective image of the power saw of FIG. 1.

FIG. 1 illustrates a side view, FIG. 2 illustrates a top view, and FIG. 3 illustrates a perspective image of an exemplary embodiment of a power saw 100 according to this disclosure. The power saw 100 includes a base plate 102, a housing 104, a spring 106, and a stop member 108. The base plate 102 is configured to move along a surface 10 of a workpiece 12, and the housing 104 includes a drive mechanism (not described in further detail herein) that drives an output spindle 103 configured to receive a cutting tool, such as a saw blade, for cutting into the workpiece 12.

The base plate 102 includes a first retaining member 110, and includes a pivot mounting member 112 and a plurality of wheels 114 (FIG. 2). In this embodiment, the pivot mounting member 112 is integral with the base plate 102. In other embodiments, the pivot mounting member 112 is a separate piece that is attached to the base plate 102 via any acceptable attachment method.

The first retaining member 110 defines an arcuate slot 116 (FIG. 1) extending along a direction 118 that is normal to a plane 120 of the base plate 102. In this embodiment, the first retaining member 110 includes a scale 111 for setting a depth of cutting, as discussed in more detail below. In this embodiment, the plurality of wheels 114 includes four wheels, and enables the base plate 102 to roll along the surface 10 of the workpiece 12. In other embodiments, other movement elements, such as treads, slides, etc. are also contemplated.

In this embodiment, the first retaining member 110 is fixed to a mounting point 113 of the base plate 102 via a mounting screw 115. Other acceptable techniques for fixing the first retaining member 110 to the base plate are also contemplated in other embodiments. In this embodiment, the base plate 102, the pivot mounting member 112, and the first retaining member 110 are formed from a metal material such as aluminum or steel. In other embodiments, the base plate, pivot mounting member 112, and first retaining member 110 can include any acceptable material or materials.

The housing 104 further includes a pivoting member 122 and a second retaining member 124. The pivoting member 122 is engaged with the pivot mounting member 112 of the base plate 102 so as to pivotably mount the housing 104 on the base plate 102 about a pivot axis 126 (FIG. 2). The pivot axis 126 is parallel with the plane 120 of the base plate 102. The second retaining member 124 is received in the arcuate slot 116 of the first retaining member 110 such that the arcuate slot 116 guides a pivoting motion of the housing 104 about the pivot axis 126.

The housing 104 is further configured such that a center of mass 128 of the housing is located between the first retaining member 110 and the pivot mounting member 112 of the base plate 102, such that a weight of the housing 104 acts on the housing 104 in a direction of the workpiece 12. In this embodiment, the center of mass 128 of the housing 104 is located so as to be between the first retaining member 110 and the pivot mounting member 112 of the base plate 102 based on the configuration of the drive mechanism and other components within the housing 104. In another embodiment, the housing further includes one or more weights configured to modify the location of the center of mass of the housing. In a further embodiment, the housing further includes one or more empty spaces so as to modify the location of the center of mass of the housing. In this embodiment, the housing is formed from a metal such as aluminum, but the housing can include any other acceptable material in other embodiments.

A first end 130 of the spring 106 is engaged with the base plate 102. In this embodiment, the first end 130 of the spring 106 is engaged with the base plate 102 in a region of the pivot mounting member 112. In other embodiments, the first end 130 is engaged with another portion of the base plate 102. In this embodiment, the base plate 102 defines a peg 132 extending out at an angle from the plane 120 of the base plate 102 away from the workpiece 12, and the spring 106 is a coil spring 106 at least partially coiled around the peg 132. Other types of springs are also contemplated in other embodiments.

A second end 134 of the spring 106 is engaged with the housing 104. In this embodiment, the second end 134 of the spring 106 is engaged with the housing 104 in a region of the pivoting member 122. In other embodiments, the second end 134 is engaged with another portion of the housing 104.

The spring 106 is configured to exert a spring force that acts against the weight of the housing 104, and such that a resultant force of the spring force and the weight of the housing 104 is sufficient to enable engagement of the cutting tool with the workpiece 101, as discussed in further detail below. The magnitude of the spring force is based on, for example, materials that form the spring 106, a shape of the spring 106, and a size of the spring 106. In different embodiments, the spring 106 can have any acceptable size or shape, and can include any acceptable material, such as spring steel.

As illustrated in FIG. 3, the stop member 108 is received in and configured to move along the arcuate slot 116. The stop member 108 includes a fixing member 136 and a third retaining member, 138.

The fixing member 136 is operable to fix the stop member 108 at a selected position along the arcuate slot 116, and includes a sliding bolt 140 and a lever 142. The sliding bolt 140 is received in the arcuate slot 116 of the first retaining member 110 so that the stop member 108 is slidable to different positions along the arcuate slot 116. The lever 142 is configured to selectively tighten and loosen the sliding bolt 140 to respectively fix and release the sliding bolt 140 within the arcuate slot 116.

Figure 4:
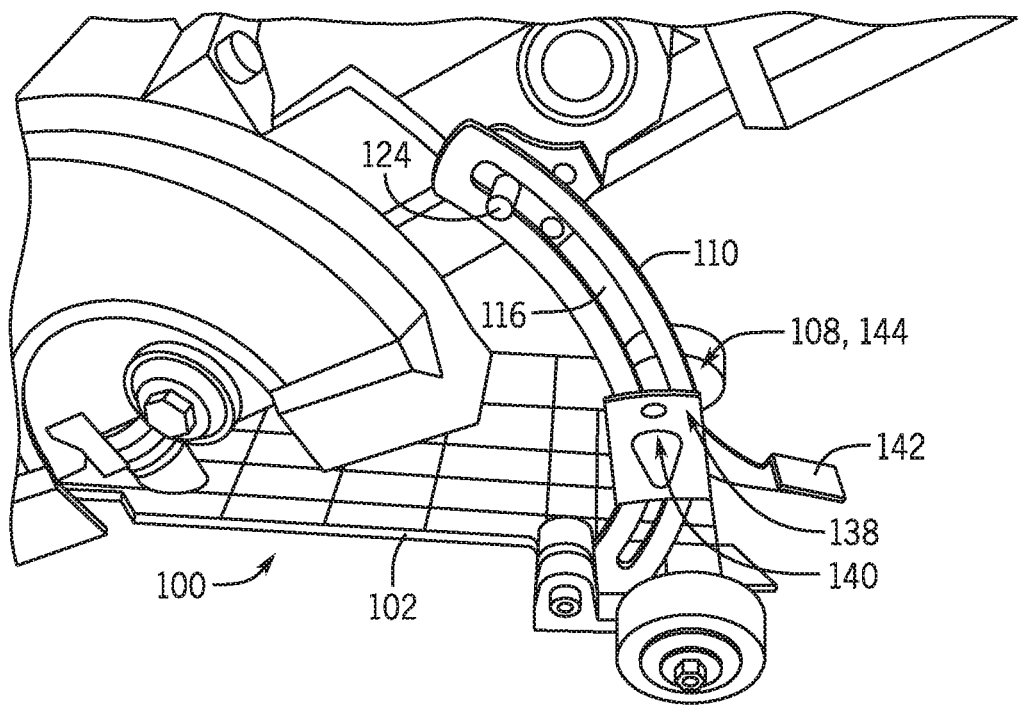
FIG. 4 is a perspective detail image of the stop member of the power saw of FIG. 1 with a housing of the power saw in a raised position.

FIG. 4 is a perspective image of the power saw 100 that illustrates the housing 104 pivoted away from the workpiece 12 and the stop member 108 positioned at a location along the arcuate slot 116. The stop member 108 defines a stop surface 144 that acts as a stop and delimits an extent of the pivoting motion of the housing 104 toward the workpiece 12. In other words, the stop member 108 is further configured such that the stop surface 144 is positioned so as to interfere with the pivoting motion of the housing 104. In this embodiment, the stop surface 144 is defined by the third retaining member 138. In other embodiments, the stop surface can be on another portion of the stop element 108.

Figure 5:
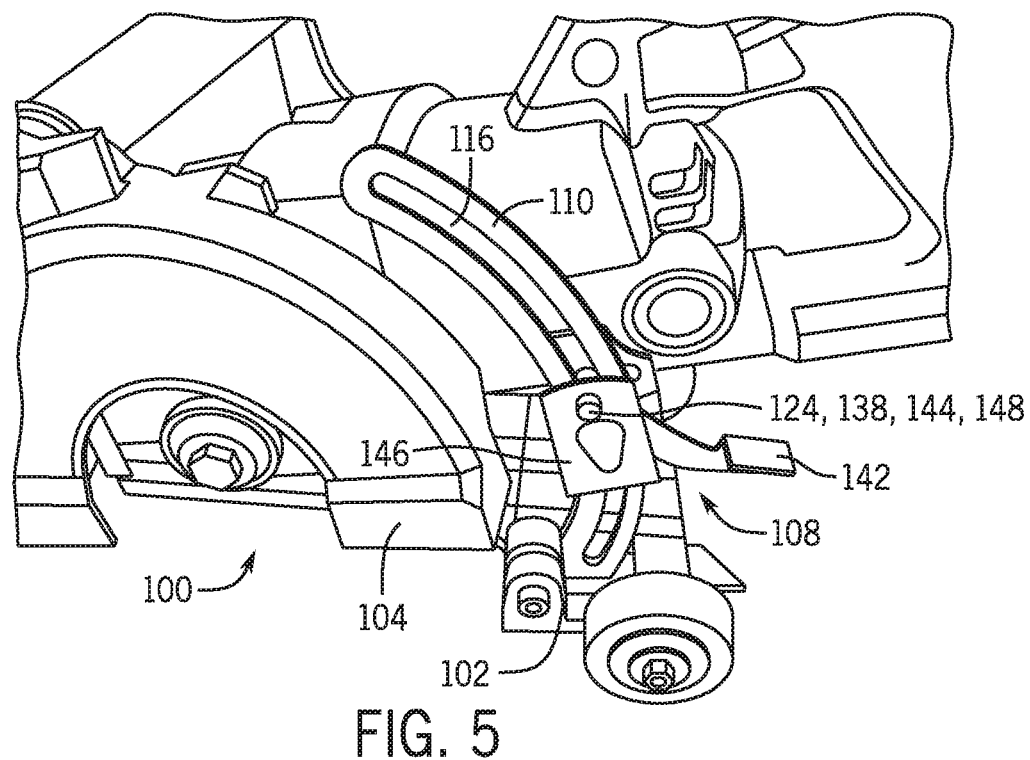
FIG. 5 is a perspective detail image of the stop member of the power saw of FIG. 1 with the housing of the power saw in a lowered position.

FIG. 5 is a perspective image of the power saw 100 that illustrates the housing 104 pivoted toward the workpiece such that the housing 104 has come into contact with the stop surface 144 of the stop member 108. Pivoting the housing 104 toward the workpiece 12 is configured to cause a cutting tool mounted on the housing to engage with the surface 10 of the workpiece 12, and continuing to pivot the housing 104 causes the cutting tool to cut into the workpiece 12 by a depth corresponding to a vertical travel distance of the pivoting motion. Thus, by acting as a stop and delimiting an extent of the pivoting motion of the housing 104, the stop surface 144 limits the depth of the cut into the surface 10 by the cutting tool. Further, since the pivoting motion is delimited based on the location of the stop member 108 along the arcuate slot 116, positioning the stop member 108 at different locations along the arcuate slot 116 results in different maximum cut depths.

As discussed above, the first retaining member 110 includes a scale 111. The scale 111 extends along the arcuate slot 116 and indicates a depth of cut into the workpiece 12 that will be performed by the cutting tool when the stop member is positioned at a particular location along the arcuate slot 116.

As illustrated in FIG. 5, the third retaining member 138 is configured to engage with the second retaining member 124 of the housing 104 as the housing 104 comes into contact with the stop member 108, such that once engaged, the third retaining member 138 holds the housing 104 in place against the stop member 108. In other words, once the housing 104 has pivoted so that the cutting tool is cutting at the maximum cut depth based on the position of the stop member 108, the third retaining member 138 enables the base plate 102 to move along the surface 10 of the workpiece while keeping the cutting tool at a consistent depth without the assistance of a user.

Further, as discussed above, the resultant force of the spring force of the spring 106 and the weight of the housing 104 is configured to be sufficient to maintain engagement of the cutting tool within the workpiece 12 at the set cutting depth. In other words, in a conventional power saw, an amount of force generally needs to be applied by a user onto the cutting tool in the direction of the workpiece 12 so as to prevent the cutting tool from "kicking up" or failing to stay at a set depth as a result of cutting through a workpiece. By configuring the power saw 100 so that such a force is instead applied by the housing 104 as discussed above, the user need not apply such force to the cutting tool.

Thus, the user is able to operate the power saw 100 according to this disclosure without constantly exerting force to keep the cutting tool at depth within the workpiece 12. As a result, operating the power saw 100 according to this disclosure is less mechanically intensive that operating a conventional power saw. Additionally, relieving the user from maintaining the depth of the cutting tool enables a faster and more accurate cut.

In this embodiment, the third retaining member 138 is a clip 138 that includes a resilient portion 146 and defines a locking recess 148. As the housing 104 comes into contact with the stop member 108, the second retaining member 124 of the housing 104 pushes out against the resilient portion 146 of the clip until a resiliency of the resilient portion 146 causes the locking recess 148 to fit around the second retailing member 124 so that the second retaining member is held captive therein.

Figure 6:
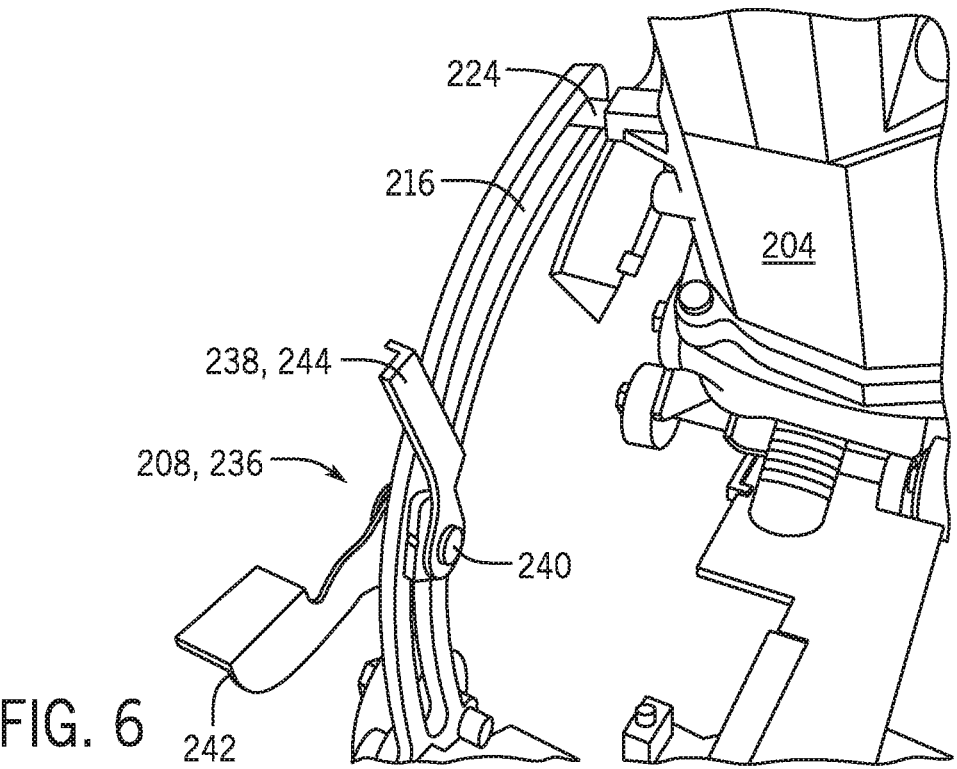
FIG. 6 is a perspective image of another exemplary embodiment of a power saw according to this disclosure.

FIG. 6 illustrates a perspective image of another exemplary embodiment of a stop member 208 according to this disclosure. In this embodiment, the third retaining member 238 is a leaf spring 238. As the housing 204 comes into contact with the stop surface 244, the second retaining member 224 of the housing 204 engages the leaf spring 238 and is held captive in place along the arcuate slot 216. In other embodiments, the third retaining member 138, 238 can be any acceptable type of retaining member.

In the embodiments illustrated in FIGS. 1-6, the lever 142, 242 is further configured so that operating the lever 142, 242 to loosen the sliding bolt 140, 240 and enable the stop member 108, 208 to move along the arcuate slot 116, 216 also actuates the third retaining member 138, 238 so as to release the second retaining member 124, 224 from the locking recess 148, 248 and enable the housing 104, 204 to pivot away from the stop member 108, 208. In other words, the fixing member 136, 236 can be used to both set a cutting depth for a cutting tool and to release the housing 104, 204 once cutting has completed.

In other embodiments, the power tool according to this disclosure includes an additional actuating mechanism for actuating the third retaining member, such as an additional lever. In another embodiment, the third retaining member is further configured to be manually actuated by a user.

In one embodiment, the arcuate slot of the first retaining member includes a toothing and defines a rack, and the second retaining member includes a knob that defines a pinion configured to move along the rack. Rotating the knob causes the pinion to move along the rack to reposition the second retaining member along the arcuate slot. The rack-and-pinion configuration enables precise control of the pivoting motion of the housing and accurate setting of the cut depth for the cutting tool.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A power tool, comprising:
a base plate configured to move along a surface of a workpiece, the base plate comprising:
a pivot mount; and
a first retaining member that defines an arcuate slot extending along a direction normal to a plane of the base plate;
a housing configured to receive a cutting tool, the housing comprising:
a pivoting member that is engaged with the pivot mount so as to pivotably mount the housing on the base plate about a pivot axis parallel to the plane of the base plate; and
a second retaining member received in the arcuate slot of the first retaining member, such that the arcuate slot guides a pivoting motion of the housing about the pivot axis;
a stop member configured to be selectively positioned at different locations along the arcuate slot separately from the second retaining member, and configured to delimit an extent of the pivoting motion of the housing toward the workpiece when the second retaining member abuts the stop member such that the position of the stop member along the arcuate slot defines a cut depth for the cutting tool; and
a spring having a first end engaged with the base plate and a second end engaged with the housing, the spring configured to exert a spring force that acts against a weight of the housing, wherein the housing has a center of mass located between the first retaining member and the pivot mount and such that the weight of the housing is acted on by gravity along a direction of the workpiece, and wherein a resultant force of the spring force allows the housing, when no other forces are applied to the housing, to be biased away from the base plate about the pivot axis to support the housing during operation of the cutting tool without the housing being biased about the pivot axis fully along the entire length of the arcuate slot.

2. The power tool of claim 1, wherein the stop member comprises:

a fixing member that is operable to fix the stop member at a selected position along the arcuate slot and release the stop member to enable the stop member to move along the arcuate slot.

3. The power tool of claim 2, wherein the stop member further comprises:

a third retaining member that is configured to engage with the second retaining member as the housing comes into contact with the stop member, such that the housing is held in place against the stop member; and the fixing member is further configured such that releasing the stop member to move along the arcuate slot causes the third retaining member to release the second retaining member and enables the housing to move relative to the stop member and to the base plate.

4. The power tool of claim 3, wherein the third retaining member is a leaf spring.

5. The power tool of claim 3, wherein the third retaining member is a clip.

6. The power tool of claim 2, wherein the fixing member comprises:

a sliding bolt received in the arcuate slot; and a lever configured to selectively tighten and loosen the sliding bolt to respectively fix and release the sliding bolt within the arcuate slot.

7. The power tool of claim 1, wherein the base plate comprises a plurality of wheels that enable the base plate to roll along the surface of the workpiece.

8. The power tool of claim 1, wherein the spring is a coil spring.

* * * * *